(12) United States Patent
Moore

(10) Patent No.: US 6,302,590 B1
(45) Date of Patent: Oct. 16, 2001

(54) ENCLOSURE FOR OPTICAL SUBASSEMBLY HAVING MECHANICAL ALIGNMENT FEATURES

(75) Inventor: Andrew Moore, Broomfield, CO (US)

(73) Assignee: Picolight Incorporated, Boulder, CO (US)

( * ) Notice: Subject to any disclaimer, the term of this patent is extended or adjusted under 35 U.S.C. 154(b) by 0 days.

(21) Appl. No.: 09/389,220

(22) Filed: Sep. 3, 1999

(51) Int. Cl.[7] .................................................. G02B 5/16
(52) U.S. Cl. .................. 385/53; 385/54; 385/55; 385/56
(58) Field of Search .................. 385/53, 54, 55, 385/56, 66, 67, 70, 88, 89, 92, 115; 359/618

(56) References Cited

U.S. PATENT DOCUMENTS

| | | | |
|---|---|---|---|
| 4,383,729 | * 5/1983 | Suzuki et al. | 385/115 |
| 5,155,784 | 10/1992 | Knott | 385/88 |
| 5,611,013 | 3/1997 | Curzio | 385/89 |

* cited by examiner

Primary Examiner—Mohammad Sikder
(74) Attorney, Agent, or Firm—Jagtiani & Associates

(57) ABSTRACT

The optical connector comprises: a housing portion including: a first bay for engaging a first plug having a waveguide, the first bay being at least partially open at a proximal end and having a wall at a distal end of the first bay; a chamber adjoining the first bay at the wall and having an optical pathway therein; at least two external passive alignment pins integrally formed with the first bay for engaging recesses in the first plug when the first plug is engaged with the first bay; the external passive alignment pins for passively aligning the waveguide to the optical pathway; and an opening in the wall for allowing transmission of an optical signal along the optical pathway between the first plug and the chamber.

15 Claims, 4 Drawing Sheets

ENCLOSURE FOR OPTICAL SUBASSEMBLY HAVING MECHANICAL ALIGNMENT FEATURES

CROSS-REFERENCE TO RELATED APPLICATIONS

This application makes reference to the following co-pending U.S. Patent Applications. The first application is U.S. App. Ser. No. 09/281,982, entitled "Fiber Optic Ferrule," filed Mar. 3, 1999. The second application is U.S. App. Ser. No. 09/323,204, entitled "Electro-Opto-Mechanical Assembly for Coupling a Light Source or Receiver to an Optical Waveguide," filed Jun. 1, 1999.

BACKGROUND OF THE INVENTION

1. Field of the Invention

The present invention relates generally to connectors for optical fibers, and more specifically for an integral mechanical alignment feature contained therein.

2. Description of the Prior Art

A typical MT-type connector for an optical multi-fiber cable includes two or more metal pins that engage or plug into housings containing optical and electrical components. Generally the pins are disposed in the plug, outside of the region where the ends of optical fibers are located, and the pins are used to align the ends of the optical fibers with optical components in the housing.

Conventionally, the pins for MT-type connectors have been made of metal and are inserted into the connector housing during or after the molding process. However, because the pins and the connector are made of two different materials and are assembled later, it is difficult to maintain the pins in the proper alignment during the manufacturing process. For example, during assembly of a conventional connector great effort must be made to insure that the pins extend the same distance from the connector; and that the pins do not tilt either vertically or horizontally from the connector; and maintaining precise spacing between pins is also an issue. Because the connector and pins may have different thermal expansion coefficients, the pins in the connector may loosen due to thermal cycling of the device. Additionally, the connector must include a considerable region of solid material to provide structural integrity to the anchoring regions for the pins.

Therefore, an improved MT-type connector is needed which either reduces or eliminates the difficulties associated with the manufacturing process and thermal cycling of the produced device.

SUMMARY OF THE INVENTION

It is therefore an object of the present invention to provide an optical connector in which alignment pins are an integral part of the connector.

It is another object of the present invention to provide an optical connector that may be easily manufactured.

It is yet another object of the present invention to provide an optical connector in which the alignment of the pins is easily controlled during manufacture.

It is yet another object of the present invention to provide an optical connector that does not require additional material fed anchoring alignment pins to the connector.

In all of the above embodiments, it is an object to provide a connector that reduces or eliminates thermal expansion effects due to thermal cycling of the device.

Finally, it is an object of the invention to provide a simple yet non-obvious pin configuration that takes advantage of the molding process to create a pin integral with the connector.

According to one broad aspect of the present invention, there is provided an optical connector comprising: a housing portion including: a first bay for engaging a first plug having a waveguide, the first bay being at least partially open at a proximal end and having a wall at a distal end of the first bay; a chamber adjoining the first bay at the wall and having an optical pathway therein; at least two external passive alignment pins integrally formed with the first bay for engaging recesses in the first plug when the first plug is engaged with the first bay; the external passive alignment pins for passively aligning the waveguide to the optical pathway; and an opening in the wall for allowing transmission of an optical signal along the optical pathway between the first plug and the chamber.

According to another broad aspect of the invention, there is provided an optical connector comprising: a housing portion including: a first bay for engaging a first plug having a waveguide, the first bay being at least partially open at a proximal end and having a wall at a distal end of the first bay; a chamber adjoining the first bay at the wall and having an optical pathway therein; at least two external passive alignment pins integrally formed with the first bay for engaging recesses in the first plug when the first plug is engaged with the first bay; the external passive alignment pins for passively aligning the waveguide to said optical pathway; an opening in the wall for allowing transmission of an optical signal along the optical pathway between the first plug and the chamber; and at least two internal passive alignment pins within the chamber for engaging an optical sub-assembly, the internal passive alignment pins for passively aligning an optical axis of the optical sub-assembly with the optical pathway.

According to yet another broad aspect of the invention, there is provided an optical connector comprising: a housing portion including: a first bay for engaging a first plug having a waveguide, the first bay being at least partially open at a proximal end and having a wall at a distal end of the first bay; a chamber adjoining the first bay at the wall and having an optical pathway therein; and an opening in the wall for allowing transmission of an optical signal along the optical pathway between the first plug and the chamber, the opening having a first diameter d1 proximal to the first bay and a second diameter d2 distal from the first bay, wherein d1≠d2, the opening for passively aligning an optical axis of the optical sub-assembly with the optical pathway.

Other objects and features of the present invention will be apparent from the following detailed description of the preferred embodiment.

BRIEF DESCRIPTION OF THE DRAWINGS

The invention will be described in conjunction with the accompanying drawings, in which.

DETAILED DESCRIPTION OF THE PREFERRED EMBODIMENT

Figure 1A:
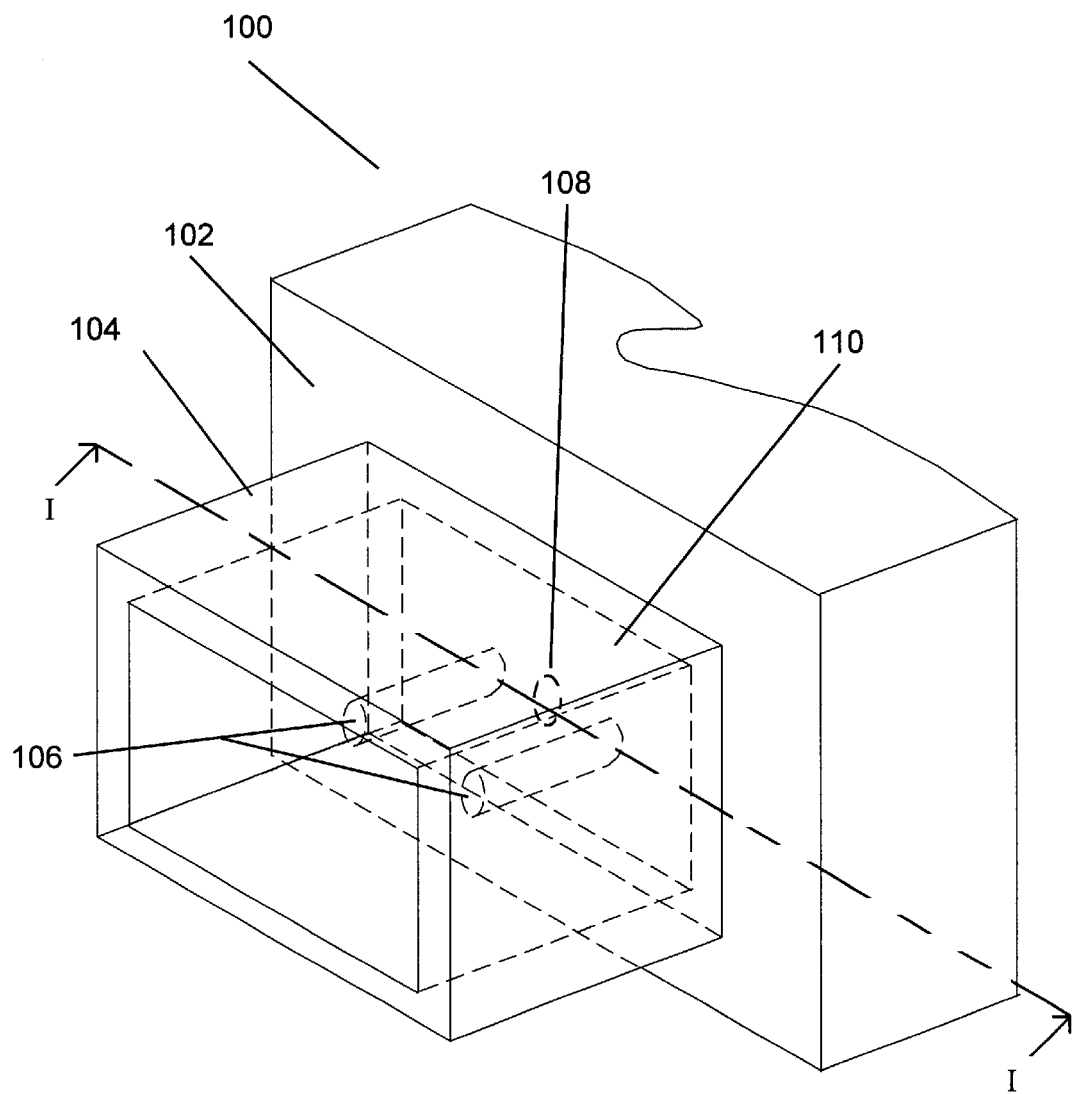
FIG. 1A is a partial perspective view from the front side of an optical connector according to the present invention with dashed lines to show interior structures.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, the term "uni-body construction" refers to a connector in which the pins and housing portion are formed from one piece of the same material by any process such as, but not limited to: molding pins and housing portions from the same material; etching pins and housing portions from the same material; cutting pins and housing portions from the same material; etc.

For the purposes of the present invention, the term "integrally formed pins" refers to alignment pins that are part of a uni-body construction.

For the purposes of the present invention, the term "optical pathway" refers to a pathway for light, such as, but not limited to: one or more optical fibers; an optical waveguide; a pathway for light defined by lenses and mirrors; etc.

For the purposes of the present invention, the term "OSA" refers to optical sub-assembly. These sub-assemblies include, but are not limited to: optical elements, electro-optic devices, opto-electric devices, mechanical alignment structures, electronic devices, and interconnect means.

For the purposes of the present invention, the term "active alignment" refers to a method for aligning two optical elements by activating a light source in one element to detect the output from the second element. The elements are moved in relation to each other to increase the detection of output of light from the second element.

For the purposes of the present invention, the term "passive alignment" refers to the alignment of two elements without the activation of a light source in the alignment process.

For the purposes of the present invention, the term "recess" refers to a partial or complete hole having any shape and being all or part of the way through an MT-type plug or other device into which a pin of a connector of the present invention extends.

For the purposes of the present invention, the term "diameter" as used in conjunction with reference numerals d1 through d4 represents the longest linear distance between two points. This term is not intended to imply a circular relationship between elements.

Description

Figure 1B:
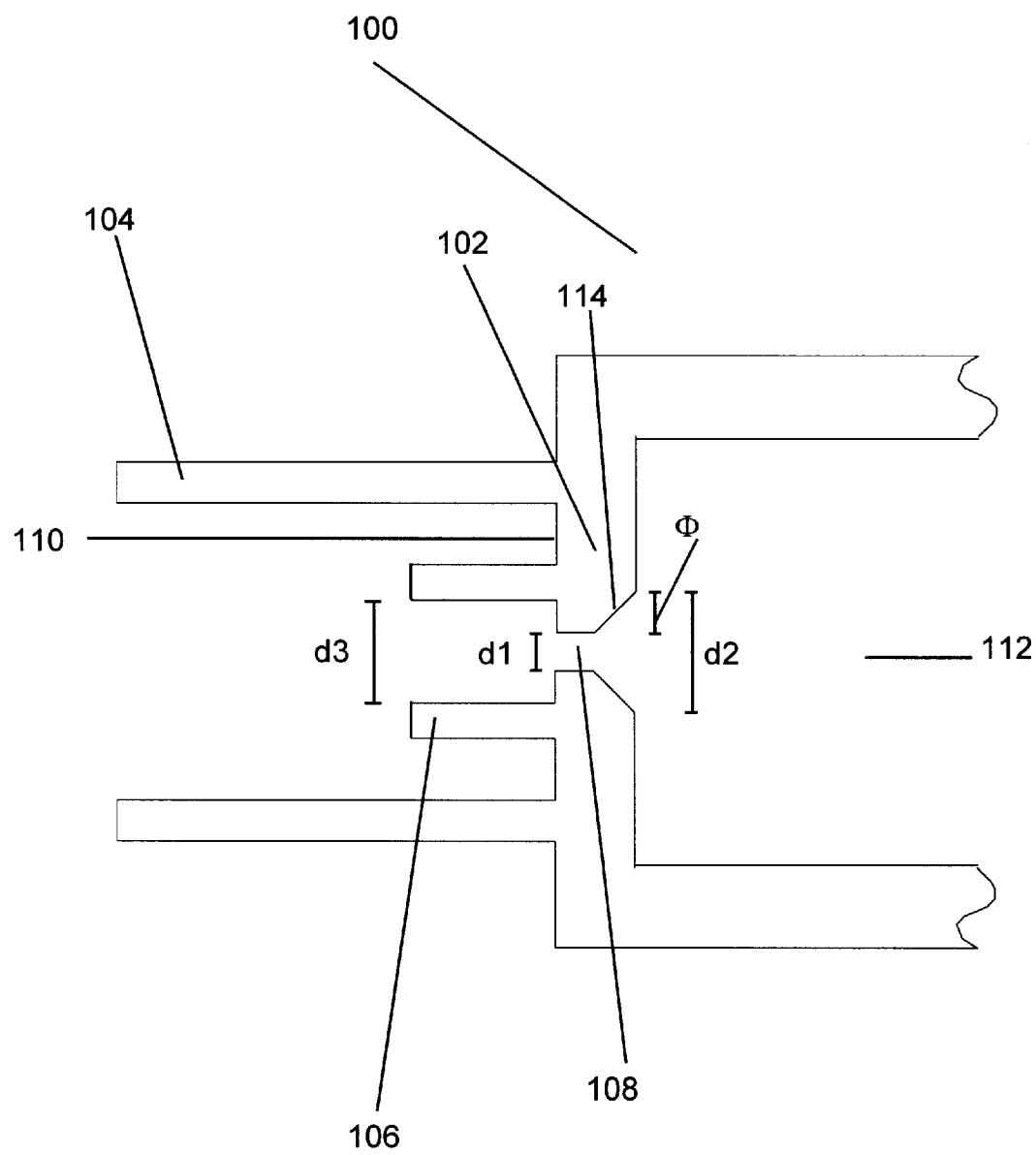
FIG. 1B is a cross-sectional view of the optical connector of FIG. 1A taken along line I—I.

With reference to the Figures, wherein like references numbers indicate like elements throughout the several views and, in particular, with reference to FIGS. 1A and 1B, an optical connector 100 is illustrated. As may be seen, connector 100 has a housing 102 containing a plug receiving bay 104. Disposed within plug receiving bay 104 are a pair of passive alignment pins 106 that are integrally mounted to or formed with housing 102 and extend toward a proximal open end of bay 104. Pins 106 are separated by an internal diameter of d3. It should be appreciated that while only two passive alignment pins 106 are illustrated, any number of passive alignment pins 106 may be disposed in communication with housing 102. In a preferred embodiment, an opening 108 in a proximal end of wall 110 of housing 102 is provided between and in line with pins 106. Opening 108 allows for communication between a plug containing an external optical pathway and an internal optical pathway within housing 102. In a preferred embodiment, the plug is a conventional MT-RJ plug (not shown).

When the plug is inserted in bay 104, pins 106 mate with recesses in the plug to align the ends of an external optical pathway with opening 108. By utilizing passive alignment pins 106, the external optical pathway is passively aligned with opening 108. In a preferred embodiment, opening 108 contains an internal optical pathway.

FIG. 1B shows a cross sectional view of an optical connector 100 taken along line I—I of FIG. 1A. As seen in FIG. 1B, opening 108 has two diameters, d1 adjacent to plug receiving bay 104 and d2 adjacent to an internal chamber 112. In a preferred embodiment, diameter d1 is smaller than diameter d2 to reduce the amount of RF emission from connector 100. For a detailed discussion of how to reduce RF emission from these openings, the reader is referred to U.S. App. Ser. No. 09/281,982, entitled "Fiber Optic Ferrule," filed Mar. 3, 1999. This application is hereby incorporated in its entirety by reference. Additionally, an interior surface 114 of housing 102 is disposed at an angle of $\Phi$. In a preferred embodiment, $\Phi$ would be between 0.0° and 90.0°. The addition of interior surface 114 and angle $\Phi$ has several advantages over a conventional right angle. These advantages include, but are not limited to: 1) assisting in placing or guiding an optical element into the optical pathways discussed below; 2) reducing diameter d1 to a minimal amount and also increasing the precision of this diameter; 3) reducing the difficulty of molding housing 102; 4) reducing breakage of pins 106 in the molding process; and 5) functioning as a passive alignment feature for aligning optical elements into the optical pathway.

The present invention preferably has a uni-body construction to simplify assembly of connector 100. A uni-body construction also eliminates the need for separate alignment pins that may penetrate too far into housing 102 of connector 100. Furthermore, because passive alignment pins 106 for plug receiving bay 104 do not extend into internal chamber 112, space is freed up in internal chamber 112 for mounting larger components in internal chamber 112. In addition, because the uni-body construction of a preferred embodiment of the present invention allows connector 100 to be molded in one piece, it is easier to control with precision the size, shape, spacing and orientation of passive alignment pins 106. Once a mold is set-up to produce housing 102 and passive alignment pins 106 of the proper size, shape, spacing and alignment, all connectors 100 produced from that mold will be identical. In contrast, in conventional MT-type connectors where the pins are separate pieces, much greater care must be exercised in manufacturing the connectors to insure that all of the connectors are identical.

Figure 2A:
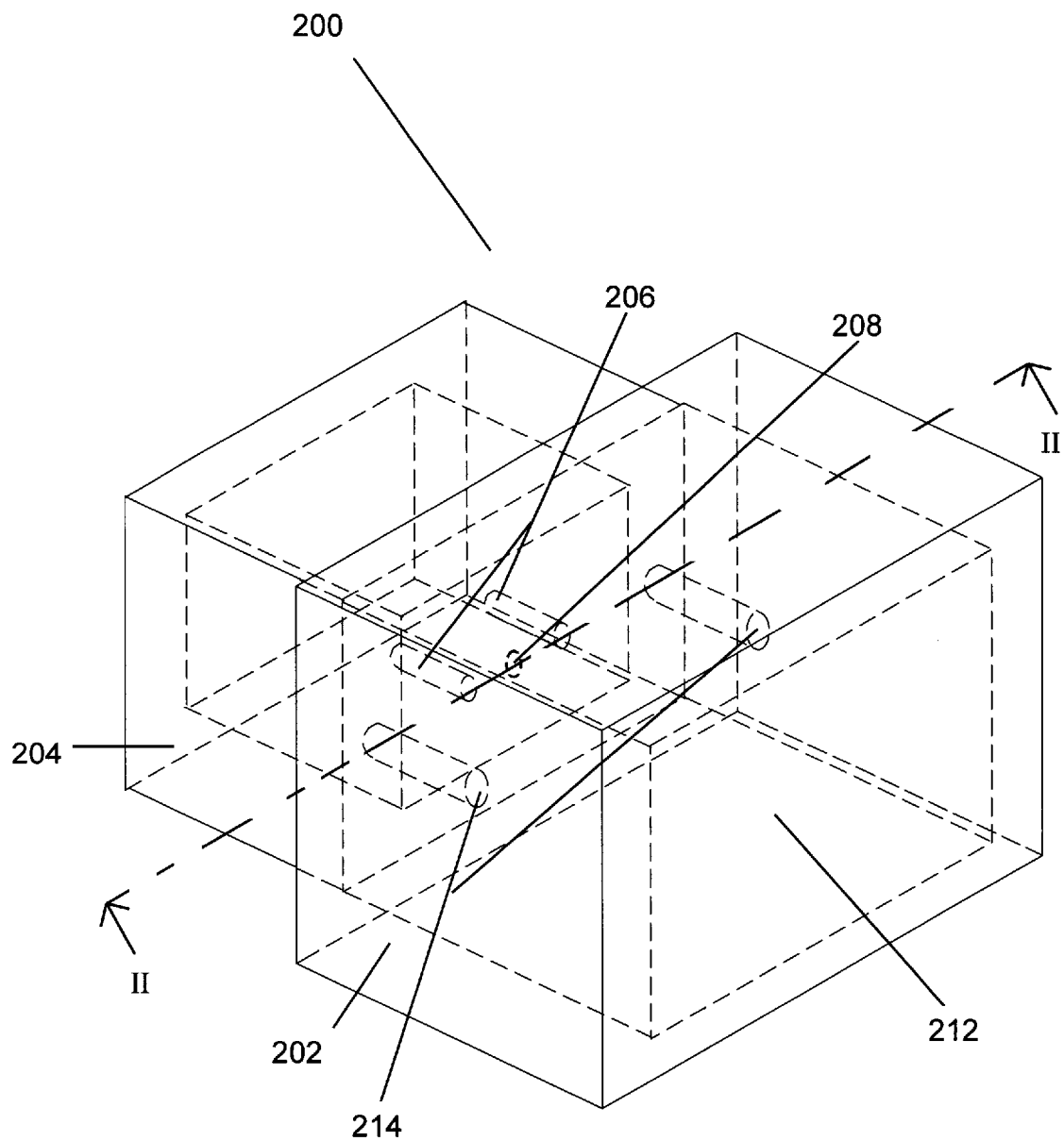
FIG. 2A is a partial perspective view from the rear of an optical connector according to the present invention with dashed lines to show interior structures.
Figure 2B:
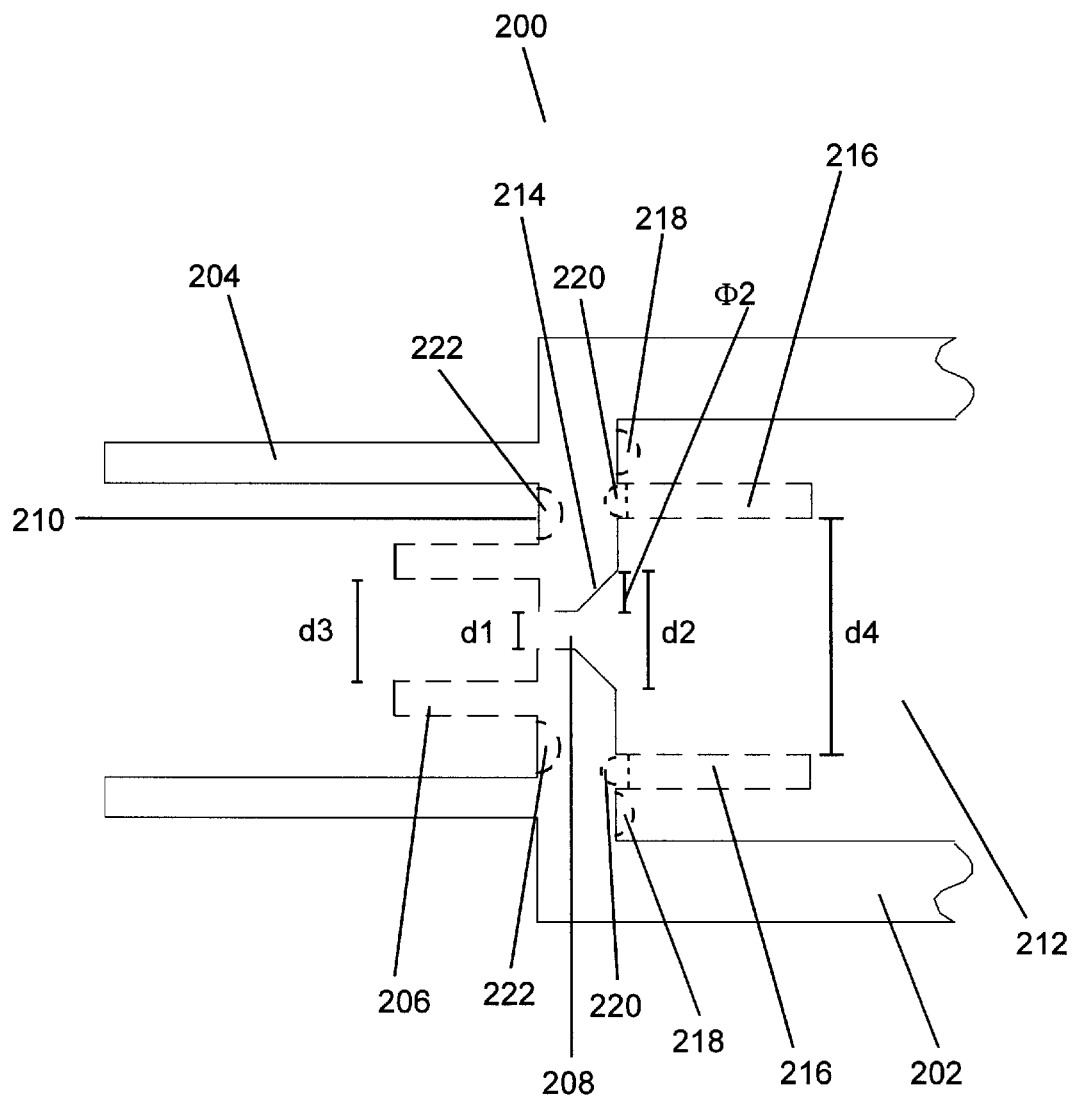
FIG. 2B is a cross-sectional view of the optical connector of FIG. 2A taken along line II—II.

Turning now to the embodiment illustrated in FIGS. 2A and 2B, an optical connector 200 is illustrated. For clarity, like elements have been provided with like reference numbers except that 100 has been added to each reference number where there is a slight difference in the particular element in this embodiment. The following discussion will focus on the differences between the elements of this embodiment and that of the preferred embodiment.

In the second embodiment of the optical connector 200, housing 202 contains a plug receiving bay 204. Disposed within plug receiving bay 204 are a pair of passive alignment pins 206 that are integrally mounted to or formed with housing 202 and extend toward a proximal open end of bay 204. Pins 206 are separated by an internal diameter of d3. It should be appreciated that while only two passive alignment pins 206 are illustrated, any number of passive alignment pins 206 may be disposed in communication with housing 202. In a preferred embodiment, an opening 208 through a wall 210 of housing 202 is provided between and in line with pins 206. Opening 208 allows for communication between a plug containing an external optical pathway and an internal optical pathway within housing 202. In a preferred embodiment, the plug is a conventional MT-RJ plug. Elements 202, 204, 206 and 208 of FIGS. 2A and 2B correspond to elements 102, 104, 106 and 108 of FIGS. 1A and 1B. These elements have similar functions to those of FIGS. 1A and 1B.

As may be seen, two internal passive alignment pins 216 are provided as integral members of housing 202. As may be seen, internal passive alignment pins 216 project into an internal chamber 212 and are separate by an internal diameter of d4. Internal passive alignment pins 216 are used to engage a backplane (not shown). Components on the backplane may include, but are not limited to leadframes, active optical elements such as, but not limited to, lasers; and passive optical elements such as, but not limited to, detectors and lenses. Internal passive alignment pins 216 may be spaced further apart than passive alignment pins 206. Wider spacing of internal passive alignment pins 216 allows for relatively large optical and electrical components to be disposed between internal passive alignment pins 216 . For example, two pairs of periscope lenses of an optical component may exist in the space between internal passive alignment pins 216. FIG. 2B illustrates pins 216 as being longer than pins 206. The relationship between the length of pins 206 and 216 is not drawn to scale. In fact, it is preferable to have pins 216 shorter than pins 206.

FIG. 2B shows a cross sectional view of optical connector 200 taken along line II—II of FIG. 2A. As seen in FIG. 2B, opening 208 has two diameters, d1 adjacent to plug receiving bay 204 and d2 adjacent to internal chamber 212. In a preferred embodiment, diameter d1 is smaller than diameter d2 to reduce the amount of RF emission from the device. For a detailed discussion of how to reduce RF emission from these openings, the reader is referred to U.S. App. Ser. No. 09/281,982, entitled "Fiber Optic Ferrule," filed Mar. 3, 1999. This application is hereby incorporated in its entirety by reference. Additionally, an interior surface 214 of housing 202 is disposed at an angle of Φ2. In a preferred embodiment, Φ2 would be between 0.0° and 90.0°. Surface 214 has similar functions and advantages of surface 114.

Although passive alignment pins 106, 206, and 216 shown in the drawing Figures have flat tips, the tips of passive alignment pins may be round, angled, or any other suitable shape for engaging the recess in the plug or respective backplane device. The passive alignment pins may extend either partway or entirely through recesses or holes in the plug or respective backplane device.

In the embodiments shown in the drawing Figures, the passive alignment pins are shown as being a cylindrical. However, it may be preferred in some circumstances to use pins that are square, rectangular, triangular, oval or other shape in cross section. Also, although only two pins are used to align each plug or backplane components in the embodiments shown in the drawing Figures, it may be desirable to use one or more pins in some circumstances. In an alternative embodiment, no pins are necessary. The preferred number of pins depends on the specific optical component being engaged by the device.

While the above embodiments have illustrated the use of alignment pins 106, 206 and 216, it should be appreciated that these pins are optional. By utilizing precision molding in combination with surfaces 114 or 214 one may construct an optical connector 100, 200 which does not require passive alignment pins 106, 206, and/or 216. In this embodiment, interior walls of internal chambers 112, 212 would assist in the alignment process.

In an alternative embodiment, recesses 222 are designed to engage a mating structure and may replace passive alignment pins 206. Recesses 222 may also be formed as bumps as illustrated by an element 218. Similarly, recesses 220 are designed to engage a mating structure disposed on an optical sub assembly. As may be seen, recesses 220 are illustrated as being disposed at the same location as passive alignment pins 216. This location is merely for illustrative purposes and it should be appreciated that recesses may be disposed anywhere along a proximal wall of chamber 212. As discussed above, recesses 220 may be replaced by elements 218.

The optical connectors of the present invention may be made of any suitable material conventionally used for waveguide connectors. Preferred materials include glass-filled engineering plastics such as glass-filled polyetherimide. Preferably, all of the pins of the connector are made integrally with the rest of the connector with a conventional method such as molding.

The size and shape of the plug receiving bay of the optical connectors will depend on the shape of the plug with which the connector is used. Similarly, the size and shape of the recesses of the plug will determine the size and shape of the passive alignment pins.

Although the manufacturing process preferred for the present invention is a unibody construction, the parts of the connector may be formed separately and joined. The housing may be permanently joined or removably connected to a circuit board, backplane, or other suitable substrate. With regard to the second embodiment, it may be preferable to form internal passive alignment pins in conjunction with the backplane device.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An optical connector comprising:
   a housing portion including:
   a first bay for engaging a first plug having at least one waveguide, said first bay being at least partially open at a proximal end and having a wall at a distal end of said first bay;
   a chamber adjoining said first bay at said wall and having an optical pathway therein;
   at least two external passive alignment pins integrally formed with said first bay for engaging recesses in the first plug when the first plug is engaged with said first bay, said external passive alignment pins for passively aligning said waveguide to said optical pathway; and
   an opening in said wall between said first bay and said chamber for allowing transmission of an optical signal therethrough, said opening comprising a portion of said optical pathway.

2. An optical connector comprising:

a housing portion including:

a first bay for engaging a first plug having at least one waveguide, said first bay being at least partially open at a proximal end and having a wall at a distal end of said first bay;

a chamber adjoining said first bay at said wall and having an optical pathway therein, said chamber including a second bay for engaging an optical sub-assembly having an optical axis;

at least two external passive alignment pins integrally formed with said first bay for engaging recesses in the first plug when the first plug is engaged with said first bay, said external passive alignment pins for passively aligning said waveguide to said optical pathway;

an opening in said wall for allowing transmission of an optical signal along said optical pathway between the first plug and said chamber; and at least two internal passive alignment pins integrally formed with said first bay and within said second bay for engaging the optical sub-assembly, said internal passive alignment pins for passively aligning said optical axis with said optical pathway.

3. The connector of claim 2, wherein said external passive alignment pins are separated by a distance d3 and said internal passive alignment pins are separated by a distance d4, and wherein d3 is different than d4.

4. The connector of claim 2, wherein said external passive alignment pins have a different diameter than said internal passive alignment pins.

5. An optical connector comprising:

a housing portion including:

a first bay for engaging a first plug having at least one waveguide, said first bay being at least partially open at a proximal end and having a wall at a distal end of said first bay;

a chamber adjoining said first bay at said wall and having an optical pathway therein;

at least two external passive alignment pins integrally formed with said first bay for engaging recesses in the first plug when the first plug is engaged with said first bay, said external passive alignment pins for passively aligning said waveguide to said optical pathway;

an opening in said wall for allowing transmission of an optical signal along said optical pathway between the first plug and said chamber; and at least two internal passive alignment pins within said second bay for engaging an optical sub-assembly, said internal passive alignment pins for passively aligning an optical axis of said optical sub-assembly with said optical pathway.

6. The connector of claim 5, wherein said external passive alignment pins are separated by a distance d3 and said internal passive alignment pins are separated by a distance d4, and wherein d3 is different than d4.

7. The connector of claim 5, wherein said external passive alignment pins have a different diameter than said internal passive alignment pins.

8. An optical connector comprising:

a housing portion including:

a first bay for engaging a first plug having a waveguide, said first bay being at least partially open at a proximal end and having a wall at a distal end of said first bay;

a chamber adjoining said first bay at said wall and having an optical pathway therein;

at least two external passive alignment pins disposed in said first bay for engaging recesses in the first plug when the first plug is engaged with said first bay, said external passive alignment pins for passively aligning said waveguide to said optical pathway;

an opening in said wall for allowing transmission of an optical signal along said optical pathway between the first plug and said chamber; and at least two internal passive alignment pins within said second bay for engaging an optical sub-assembly, said internal passive alignment pins for passively aligning an optical axis of said optical sub-assembly with said optical pathway.

9. The connector of claim 8, wherein said external passive alignment pins are separated by a distance d3 and said internal passive alignment pins are separated by a distance d4, and wherein d3 is different than d4.

10. The connector of claim 8, wherein said at external passive alignment pins have a different diameter than said internal passive alignment pins.

11. An optical connector comprising:

a housing portion including:

a first bay for engaging a first plug having a waveguide, said first bay being at least partially open at a proximal end and having a wall at a distal end of said first bay;

a chamber adjoining said first bay at said wall and having an optical pathway therein; and an opening in said wall for allowing transmission of an optical signal along said optical pathway between the first plug and said chamber, said opening having a first diameter d1 proximal to said first bay and a second diameter d2 distal from said first bay, wherein d1≠d2, said opening for passively aligning an optical axis of said optical sub-assembly with said optical pathway.

12. The connector of claim 1, wherein said opening is located between at least two of said at least two external alignment pins.

13. The connector of claim 12, wherein said chamber further comprises a second bay for engaging an optical sub-assembly having an optical axis; and at least two internal passive alignment pins integrally formed with said first bay and within said second bay for engaging the optical sub-assembly, said internal passive alignment pins for passively aligning said optical axis with said optical pathway.

14. The connector of claim 13, wherein said external passive alignment pins are separated by a distance d3 and said internal passive alignment pins are separated by a distance d4, and wherein d3 is different than d4.

15. The connector of claim 13, wherein said external passive alignment pins have a different diameter than said internal passive alignment pins.

* * * * *